(12) United States Patent
Wu et al.

(10) Patent No.: US 12,445,914 B2
(45) Date of Patent: Oct. 14, 2025

(54) SELECTING A BASE UNIT IN RESPONSE TO A HANDOVER CONDITION BEING TRIGGERED

(71) Applicant: Lenovo (Beijing) Limited, Beijing (CN)

(72) Inventors: Lianhai Wu, Beijing (CN); Jing Han, Beijing (CN); Haiming Wang, Beijing (CN); Zhuoyun Zhang, Beijing (CN); Hongchao Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/073,967

(22) Filed: Dec. 2, 2022

(65) Prior Publication Data

US 2023/0098506 A1 Mar. 30, 2023

Related U.S. Application Data

(63) Continuation of application No. 16/959,952, filed as application No. PCT/CN2018/072118 on Jan. 10, 2018, now Pat. No. 11,595,863.

(51) Int. Cl.
*H04W 36/00* (2009.01)
*H04W 74/0833* (2024.01)

(52) U.S. Cl.
CPC ... *H04W 36/0061* (2013.01); *H04W 36/0072* (2013.01); *H04W 74/0833* (2013.01)

(58) Field of Classification Search
CPC ......... H04W 36/0061; H04W 36/0072; H04W 74/0833; H04W 74/0838; H04W 74/004;

(Continued)

(56) References Cited

U.S. PATENT DOCUMENTS

2010/0091734 A1* 4/2010 Park .................. H04W 92/20
370/331
2012/0026972 A1* 2/2012 Miao ................. H04W 36/0072
370/331

(Continued)

FOREIGN PATENT DOCUMENTS

CN 103782628 A 5/2014
CN 103841608 A 6/2014

(Continued)

OTHER PUBLICATIONS

PCT/CN2018/072118, "International Search Report and the Written Opinion of the International Search Authority" ISA/CN, State Intellectual Property Office of the P.R. China, Sep. 25, 2018, pp. 1-6.

(Continued)

*Primary Examiner* — Kan Yuen
(74) *Attorney, Agent, or Firm* — Kunzler Bean & Adamson

(57) ABSTRACT

Apparatuses, methods, and systems are disclosed for selecting a base unit in response to a handover condition being triggered. One method (1000) includes selecting (1002) a base unit of multiple base units for handover in response to at least one base unit of the multiple base units triggering a handover condition. The method (1000) includes transmitting (1004) a random access preamble to the base unit. The method (1000) includes performing (1006) a reestablishment procedure to establish communication with one base unit of the multiple base units in response to determining an inability to access each base unit of the multiple base units that meets the handover condition.

17 Claims, 10 Drawing Sheets

(58) Field of Classification Search
CPC ........... H04W 74/006; H04W 36/0005; H04W 74/0836
See application file for complete search history.

(56) References Cited

U.S. PATENT DOCUMENTS

| | | | | |
|---|---|---|---|---|
| 2015/0071250 | A1* | 3/2015 | Dai | H04W 36/0064 |
| | | | | 370/331 |
| 2015/0215965 | A1* | 7/2015 | Yamada | H04W 76/27 |
| | | | | 370/329 |
| 2015/0264621 | A1* | 9/2015 | Sivanesan | H04W 36/302 |
| | | | | 455/436 |
| 2016/0057688 | A1* | 2/2016 | Koskinen | H04W 74/0833 |
| | | | | 370/332 |
| 2016/0262066 | A1* | 9/2016 | Ozturk | H04W 74/0833 |
| 2016/0338131 | A1* | 11/2016 | Godin | H04W 36/324 |
| 2018/0049214 | A1* | 2/2018 | Kubota | H04W 72/1215 |
| 2018/0070278 | A1* | 3/2018 | Uemura | H04W 76/10 |
| 2018/0192335 | A1* | 7/2018 | Bontu | H04W 74/0833 |
| 2019/0037450 | A1* | 1/2019 | Chang | H04W 36/18 |
| 2019/0174362 | A1* | 6/2019 | Yang | H04W 36/0016 |
| 2020/0015132 | A1* | 1/2020 | Liu | H04W 36/385 |
| 2020/0022055 | A1* | 1/2020 | Yan | H04W 74/0833 |
| 2020/0329503 | A1* | 10/2020 | Da Silva | H04W 72/54 |

FOREIGN PATENT DOCUMENTS

| | | |
|---|---|---|
| CN | 106604335 A | 4/2017 |
| WO | 2014065828 A1 | 5/2014 |
| WO | 2015118405 A2 | 8/2015 |

OTHER PUBLICATIONS

Ericsson, Remaining details on RACH procedure, 3GPP TSG RAN WG1 Meeting #91, R1-1720941, 27-Dec. 1, 2017, pp. 1-24, Reno, Nevada, US.

Huawei, HiSilicon, Further discussion on Conditional HO, 3GPP TSG-RAN WG2 #100, R2-1712509, Nov. 27-Dec. 1, 2017, pp. 1-3, Reno, Nevada, USA.

Ericsson, Conditional Handover, 3GPP TSG-RAN WG2 #100, R2-1713606, Nov. 27-Dec. 1, 2017, pp. 1-5, Reno, Nevada.

ASTRI, TCL Communication Ltd., Discussion on Conditional Handover in NR, 3GPP TSG-RAN WG2 Meeting #100, R2-1713747, Nov. 27-Dec. 1, 2017, pp. 1-6, Reno, USA.

* cited by examiner

SELECTING A BASE UNIT IN RESPONSE TO A HANDOVER CONDITION BEING TRIGGERED

FIELD

The subject matter disclosed herein relates generally to wireless communications and more particularly relates to selecting a base unit in response to a handover condition being triggered.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Cell Radio Network Temporary Identifier ("C-RNTI"), Dedicated Control Channel ("DCCH"), Downlink ("DL"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Long Term Evolution ("LTE"), Multiple Access ("MA"), Modulation Coding Scheme ("MCS"), Mobile Country Code ("MCC"), Mobile Network Code ("MNC"), Machine Type Communication ("MTC"), Master Information Block ("MIB"), Mobility Management ("MM"), Mobility Management Entity ("MME"), Non-Access Stratum ("NAS"), Narrowband ("NB"), Negative-Acknowledgment ("NACK") or ("NAK"), Next Generation Node B ("gNB"), Orthogonal Frequency Division Multiplexing ("OFDM"), Over-the-Air ("OTA"), Policy Control Function ("PCF"), Packet Data Convergence Protocol ("PDCP"), Public Land Mobile Network ("PLMN"), Pointer ("PTR"), Quality of Service ("QoS"), Random Access Channel ("RACH"), Radio Link Control ("RLC"), Radio Link Failure ("REF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Service Data Unit ("SDU"), Sequence Number ("SN"), Single Carrier Frequency Division Multiple Access ("SC-FDMA"), Subscriber Management Function ("SMF"), Subscriber Identity Module ("SIM"), System Information Block ("SIB"), Subscription Concealed Identifier ("SUCI"), Subscription Permanent Identifier ("SUPI"), Timing Advance Group ("TAG"), Tracking Area ("TA"), Transport Network Layer ("TNL"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("IMF"), Universal Subscriber Identity Module ("USIM"), Visited Policy Control Function ("V-PCF"), Visited Public Land Mobile Network ("VPLMN"), and World-wide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a remote unit may have multiple base units that trigger a handover condition. In such networks, a base unit for communication may be selected.

BRIEF SUMMARY

Methods for selecting a base unit in response to a handover condition being triggered are disclosed. Apparatuses and systems also perform the functions of the apparatus. In one embodiment, the method includes selecting a base unit of multiple base units for handover in response to at least one base unit of the multiple base units triggering a handover condition. In various embodiments, the method includes transmitting a random access preamble to the base unit. In certain embodiments, the method includes performing a reestablishment procedure to establish communication with one base unit of the multiple base units in response to determining an inability to access each base unit of the multiple base units that meets the handover condition.

In one embodiment, the method includes determining an inability to access the base unit. In a further embodiment, determining the inability to access the base unit includes receiving no response from the base unit as a result of transmitting the random access preamble to the base unit. In certain embodiments, the method includes, in response to determining the inability to access the base unit, transmitting a second random access preamble to a second base unit of the multiple base units. In various embodiments, the method includes receiving configuration information indicating the handover condition corresponding to the base unit. In some embodiments, the configuration information includes a radio resource control connection reconfiguration message having mobility control information.

An apparatus for selecting a base unit in response to a handover condition being triggered, in one embodiment, includes a processor that selects a base unit of multiple base units for handover in response to at least one base unit of the multiple base units triggering a handover condition. In various embodiments, the apparatus includes a transmitter that transmits a random access preamble to the base unit. In some embodiments, the processor performs a reestablishment procedure to establish communication with one base unit of the multiple base units in response to determining an inability to access each base unit of the multiple base units that meets the handover condition.

In one embodiment, a method for transmitting a request for information includes receiving a random access message from a remote unit. In various embodiments, the method includes, in response to receiving the random access message, transmitting to a base unit a request for sequence number status transfer information, data forwarding information, or a combination thereof.

In one embodiment, the random access message includes a random access preamble. In a further embodiment, the random access message includes a radio resource control reconfiguration complete message. In certain embodiments, the method includes receiving the sequence number status transfer information, data corresponding to the data forwarding information, or a combination thereof in response to transmitting the request.

An apparatus for transmitting a request for information, in one embodiment, includes a receiver that receives a random access message from a remote unit. In various embodiments, the apparatus includes a transmitter that, in response to receiving the random access message, transmits to a base unit a request for sequence number status transfer information, data forwarding information, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
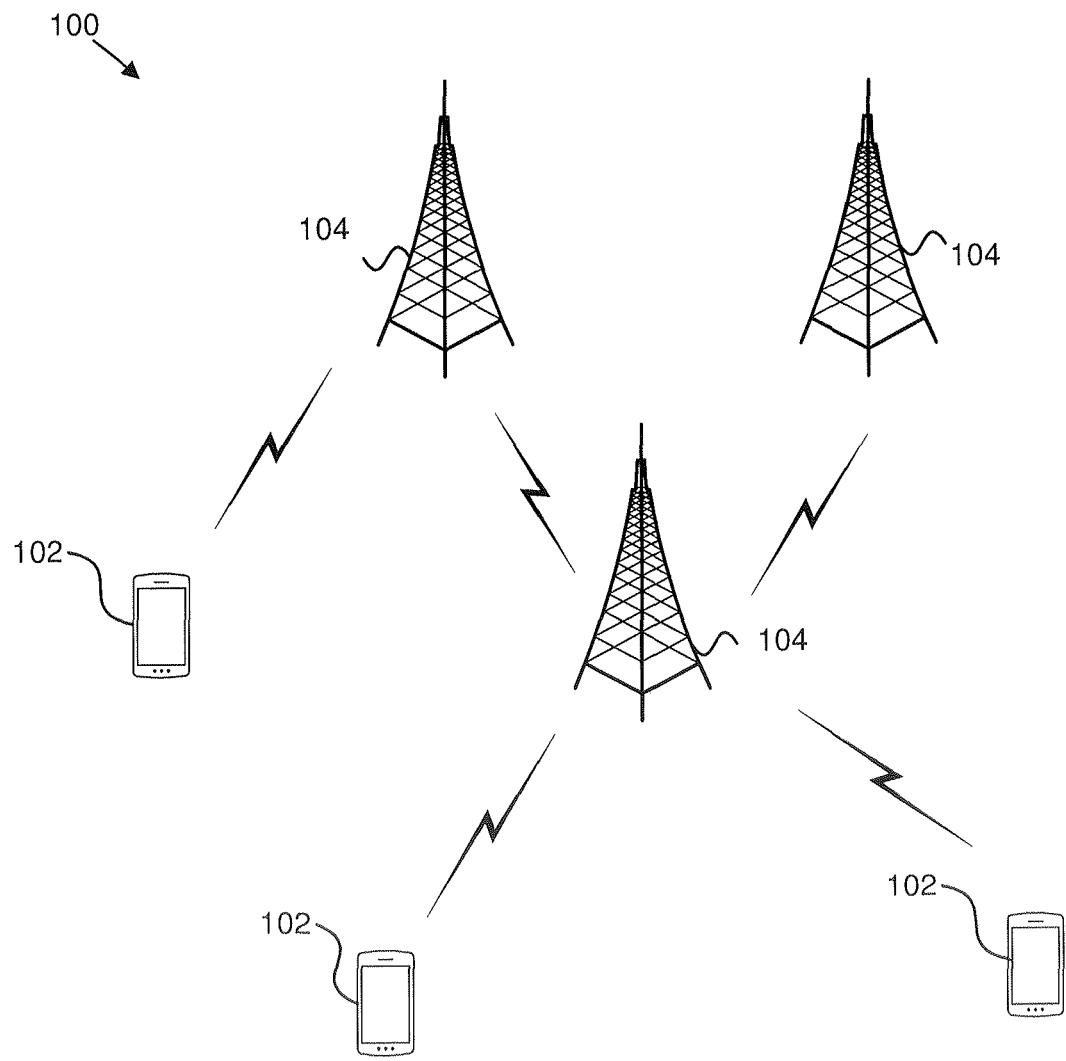
FIG. 1 is a schematic block diagram illustrating one embodiment of a wireless communication system for selecting a base unit in response to a handover condition being triggered.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for selecting a base unit in response to a handover condition being triggered. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may select a base unit of multiple base units for handover in response to at least one base unit of the multiple base units triggering a handover condition. In various embodiments, the remote unit 102 may transmit a random access preamble to the base unit. In certain embodiments, the remote unit 102 may perform a reestablishment procedure to establish communication with one base unit of the multiple base units in response to determining an inability to access each base unit of the multiple base units that meets the handover condition. Accordingly, a remote unit 102 may be used for selecting a base unit in response to a handover condition being triggered.

In various embodiments, a network unit 104 may receive a random access message from a remote unit 102. In some embodiments, the network unit 102 may, in response to receiving the random access message, transmit to a base unit a request for sequence number status transfer information, data forwarding information, or a combination thereof. Accordingly, a network unit 104 may be used for transmitting a request for information.

Figure 2:
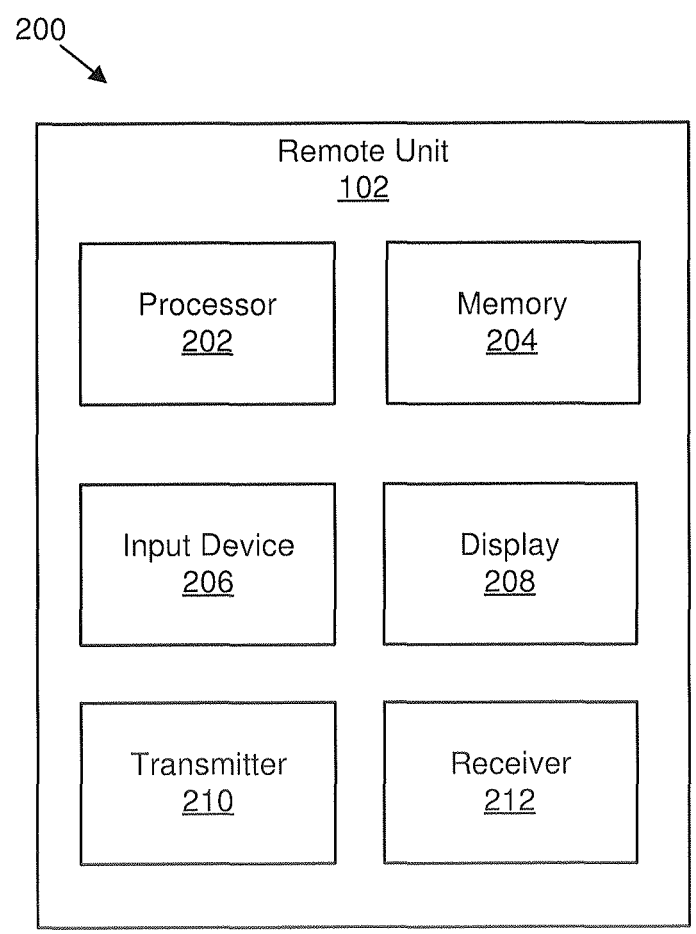
FIG. 2 is a schematic block diagram illustrating one embodiment of an apparatus that may be used for selecting a base unit in response to a handover condition being triggered.

FIG. 2 depicts one embodiment of an apparatus 200 that may be used for selecting a base unit in response to a handover condition being triggered. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may select a base unit of multiple base units for handover in response to at least one base unit of the multiple base units triggering a handover condition. In various embodiments, the processor 202 may perform a reestablishment procedure to establish communication with one base unit of the multiple base units in response to determining an inability to access each base unit of the multiple base units that meets the handover condition. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to triggering a handover condition. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In certain embodiments, the transmitter 210 is used to transmit a random access preamble to a base unit. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
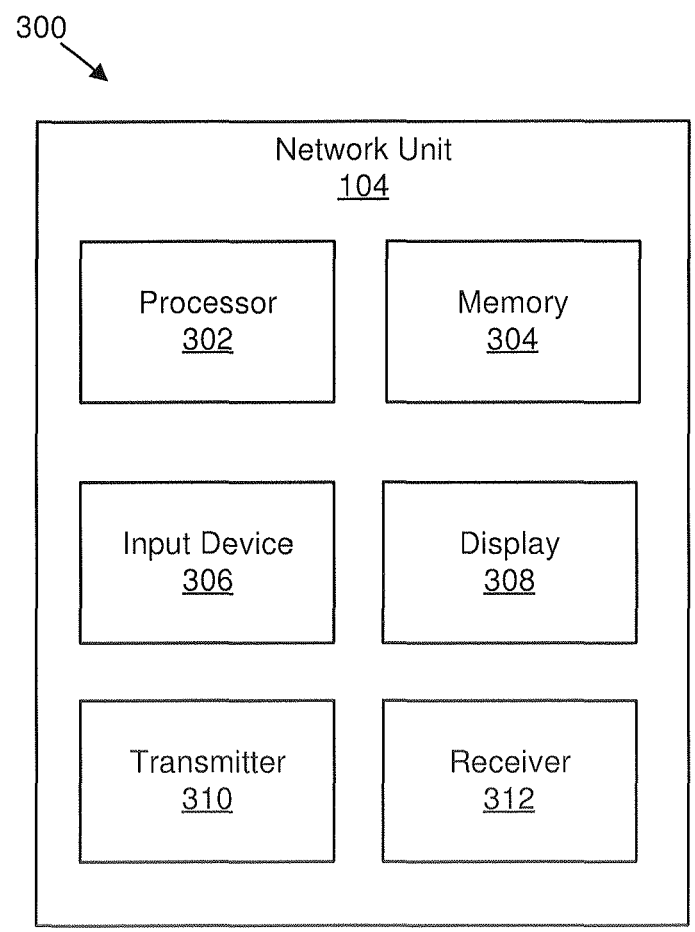
FIG. 3 is a schematic block diagram illustrating one embodiment of an apparatus that may be used for transmitting a request for information.

FIG. 3 depicts one embodiment of an apparatus 300 that may be used for transmitting a request for information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive a random access message from a remote unit 102. In various embodiments, the transmitter 310 is used to, in response to receiving the random access message, transmit to a base unit a request for sequence number status transfer information, data forwarding information, or a combination thereof. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
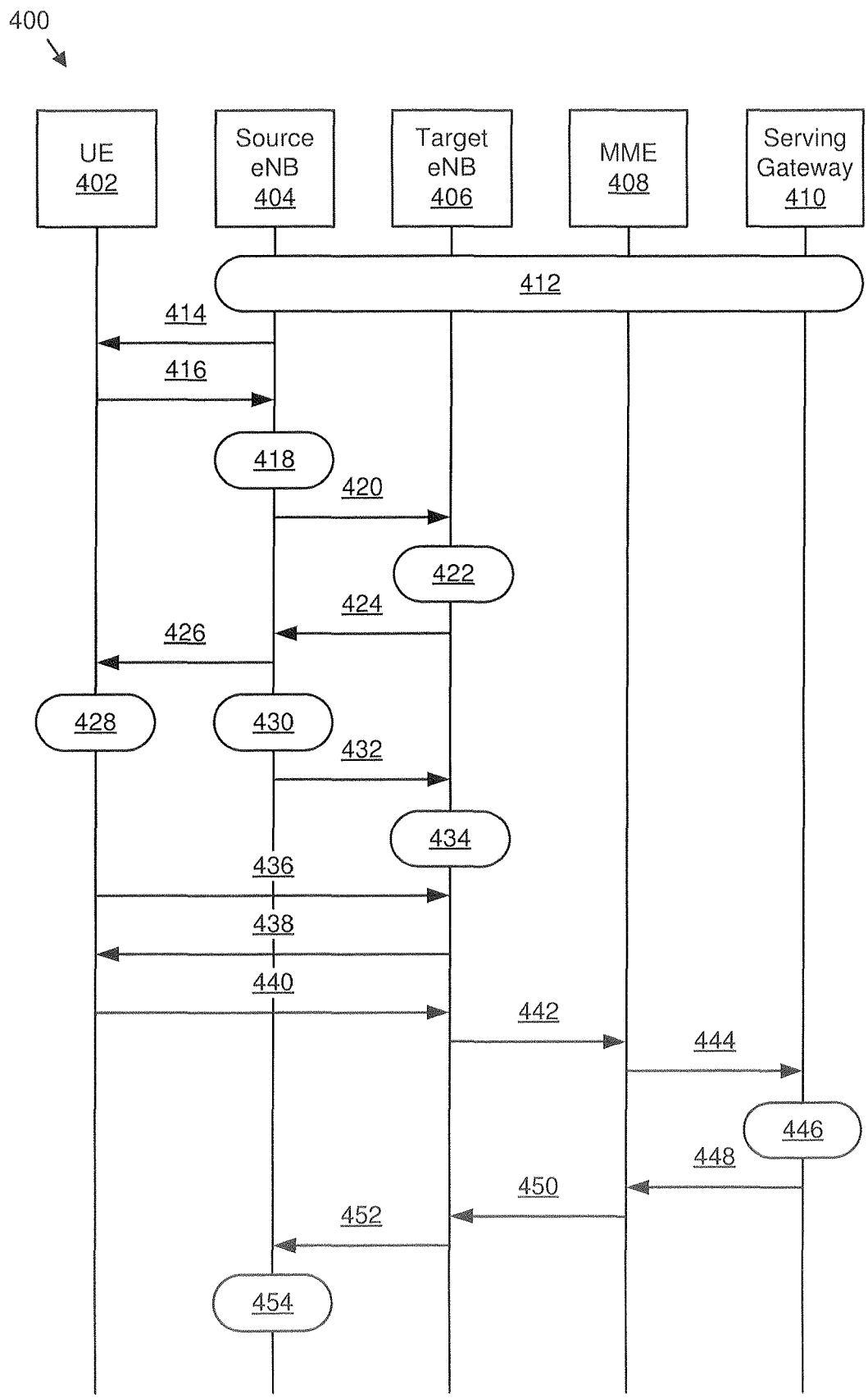
FIG. 4 illustrates one embodiment of communications for handover.

FIG. 4 illustrates one embodiment of communications 400 for handover.

Specifically, communications 400 between a UE 402, a source eNB 404, a target eNB 406, an MME 408, and a serving gateway 410 are illustrated. As may be appreciated, any of the communications 400 described herein may be considered messages and/or parts of messages. Moreover, in some embodiments, neither the MME 408, nor the serving gateway 410 may change during this handover procedure.

In certain embodiments, the UE 402 context within the source eNB 404 may include information regarding roaming and access restrictions which may have been provided at connection establishment and/or at a last TA update. The information may be provided 412 to and/or from the source eNB 404, the target eNB 406, the MME 408, and/or the serving gateway 410.

In some embodiments, in a first communication 414, the source eNB 404 may transmit information to the UE 402. Specifically, the source eNB 404 may configure UE 402 measurement procedures based on the roaming and access restriction information and/or other information, such as available multiple frequency band information. In certain embodiments, measurements provided by the source eNB 404 may assist a function controlling the UE's 402 connection mobility.

In various embodiments, in a second communication 416, the UE 402 may transmit information to the source eNB 404. Specifically, a measurement report may be triggered by the UE 402 and sent to the source eNB 404 as part of the second communication 416.

In certain embodiments, the source eNB 404 may make 418 a decision based on the measurement report and RRM information used to hand off the UE 402.

In some embodiments, in a third communication 420, the source eNB 404 may transmit information to the target eNB 406. Specifically, the source eNB 404 may issue a handover request message to the target eNB 406. In various embodiments, the source eNB 404 may pass information to prepare the target eNB 406 for handover. Such information may include a UE 402 X2 signaling context reference, a UE 402 S1 EPC signaling context reference, a target cell ID, RRC context information including a C-RNTI of the UE 402, an AS-configuration, and/or E-RAB context and physical layer ID of the source cell. In some embodiments, UE 402 X2 and/or UE 402 S1 signaling references may enable the target eNB 406 to address the source eNB 404 and the EPC. In various embodiments, the E-RAB context may include necessary RNL and TNL addressing information and/or QoS profiles of the E-RABs.

In various embodiments, admission control may be performed 422 by the target eNB 406. In one embodiment, the admission control may be dependent on E-RAB QoS information thereby increasing the likelihood of a successful handover, such as if the resources are granted by the target eNB 406. In certain embodiments, the target eNB 406 may configure required resources according to received E-RAB QoS information and reserves a C-RNTI and optionally a RACH preamble. In some embodiments, the AS-configuration to be used in the target cell may either be specified independently (e.g., an establishment) or as a delta compared to the AS-configuration used in the source cell (e.g., a reconfiguration).

In certain embodiments, in a fourth communication 424, the target eNB 406 may transmit information to the source eNB 404. Specifically, the target eNB 406 may send a handover request acknowledge message to the source eNB 404. In some embodiments, the target eNB 406 prepares for handover with level 1 ("L1") and/or level 2 ("L2") and sends the handover request acknowledge message to the source eNB 404. In various embodiments, the handover request acknowledge message includes a transparent container to be sent to the UE 402 as an RRC message to perform the handover. In such embodiments, the transparent container may include a new C-RNTI, target eNB 406 security algorithm identifiers for selected security algorithms, a dedicated RACH preamble, and/or other parameters (e.g., access parameters, SIBs, etc.). In one embodiment, the handover request acknowledge message may include RNL and/or TNL information for forwarding tunnels. In certain embodiments, after the source eNB 404 receives the handover request acknowledge message, or as soon as the transmission of the handover command is initiated in DL, data forwarding may be initiated.

In some embodiments, in a fifth communication 426, the source eNB 404 may transmit information to the UE 402. Specifically, the source eNB 404 may send an RRC message generated by the target eNB 406 to the UC 402 to perform the handover. The RRC message may include a radio resource control connection reconfiguration message (e.g., RRCConnectionReconfiguration) having mobility control information (e.g., mobilityControlInformation). In various embodiments, prior to sending the RRC message, the source eNB 404 may perform integrity protection and ciphering of the RRC message. In certain embodiments, the UE 402 receives the radio resource control connection reconfiguration message with parameters (e.g., new C-RNTI, target eNB 406 security algorithm identifiers, dedicated RACH preamble, target eNB 406 SIBs, etc.) and is commanded by the source eNB 404 to perform the handover. In certain embodiments, the UE 402 does not delay handover execution for delivering HARQ/ARQ responses to the source eNB 404.

In various embodiments, the UE 402 may detach 428 from the old cell and synchronize to the new cell. In certain embodiments, the source eNB 404 may deliver 430 buffered and in transit packets to the target eNB 406.

In some embodiments, in a sixth communication 432, the source eNB 404 may transmit information to the target eNB 406. Specifically, the source eNB 404 may send a SN status transfer message to the target eNB 406 to convey an uplink PDCP SN receiver status and a downlink PDCP SN transmitter status of E-RABs for which PDCP status preservation applies (e.g., for RLC AM). In certain embodiments, the uplink PDCP SN receiver status includes at least the PDCP SN of a first missing UL SDU and may include a bit map of the receive status of the out of sequence UL SDUs that the UE needs to retransmit in the target cell, if there are any such SDUs. In various embodiments, the downlink PDCP SN transmitter status may indicate the next PDCP SN that the target eNB 406 may assign to new SDUs, not having a PDCP SN yet. In some embodiments, the source eNB 404 may omit sending this message if none of the E-RABs of the UE 402 are to be treated with PDCP status preservation.

In various embodiments, the target eNB 406 may buffer 434 packets received from the source eNB 404.

In certain embodiments, in a seventh communication 436, the UE 402 may transmit information to the target eNB 406. Specifically, the UE 402, after receiving the radio resource control connection reconfiguration message including the mobility control information, may perform synchronization with the target eNB 406 and may access the target cell via RACH. In some embodiments, the synchronization may occur following a contention-free procedure if a dedicated RACH preamble was indicated in the mobility control information, or the synchronization may occur following a contention-based procedure if no dedicated preamble was indicated. In various embodiments, the UE 402 derives target eNB 406 specific keys and configures security algorithms to be used in the target cell.

In some embodiments, in an eighth communication 438, the target eNB 406 may transmit information to the UE 402. Specifically, the target eNB 406 may respond to the UE 402 synchronization with UL allocation and timing advance information.

In various embodiments, in a ninth communication 440, the UE 402 may transmit information to the target eNB 406. Specifically, the UE 402, after successfully accessing the target cell, may send a radio resource control connection reconfiguration complete (e.g., RRCConnectionReconfigurationComplete) message including C-RNTI to the target eNB 406 confirm the handover. In some embodiments, the UE 402 may send an uplink buffer status report to the target eNB 406 to indicate that the handover procedure is complete for the UE 402. In certain embodiments, the target eNB 406 may verify the C-RNTI sent in the radio resource control connection reconfiguration complete message. In one embodiment, after the target eNB 406 verifies the C-RNTI, the target eNB 406 may begin sending data to the UE 402.

In certain embodiments, in a tenth communication 442, the target eNB 406 may transmit information to the MME 408. Specifically, the target eNB 406 may send a path switch request message to the MME 408 to inform the MME 408 that the UE 402 has changed cells.

In some embodiments, in an eleventh communication 444, the MME 408 may transmit information to the serving gateway 410. Specifically, the MME 408 may send a modify bearer request message to the serving gateway 410.

In various embodiments, the serving gateway 410 may switch 446 the downlink data path to the target eNB 406. In some embodiments, the serving gateway 410 sends one or more end marker packets on the old path to the source eNB 404 and then may release any user plane and/or TNL resources corresponding to the source eNB 404.

In certain embodiments, in a twelfth communication 448, the serving gateway 410 may transmit information to the MME 408. Specifically, the serving gateway 410 may send a modify bearer response message to the MME 408.

In some embodiments, in a thirteenth communication 450, the MME 408 may transmit information to the target eNB 406. Specifically, the MME 408 may confirm the path switch request message with a path switch request acknowledge message sent to the target eNB 406.

In various embodiments, in a fourteenth communication 452, the target eNB 406 may transmit information to the source eNB 404. Specifically, the target eNB 406 may send a UE 402 context release message to the source eNB 404 to inform the source eNB 404 of a successful handover. In one embodiment, the source eNB 404 receiving the context release message may trigger the release of resources by the source eNB 404. Moreover, the target eNB 406 may send the context release message after the path switch request acknowledge message is received from the MME 408.

In certain embodiments, upon reception of the UE 402 context release message, the source eNB 404 may release 454 radio and control plane related resources allocated to the UE 402 context. In such embodiments, any ongoing data forwarding may continue.

In various embodiments, a random access procedure may be divided into two different types. For example, the random access procedure may be a contention based random access procedure as described in relation to FIG. 5, or the random access procedure may be a non-contention based random access procedure as described in relation to FIG. 6.

Figure 5:
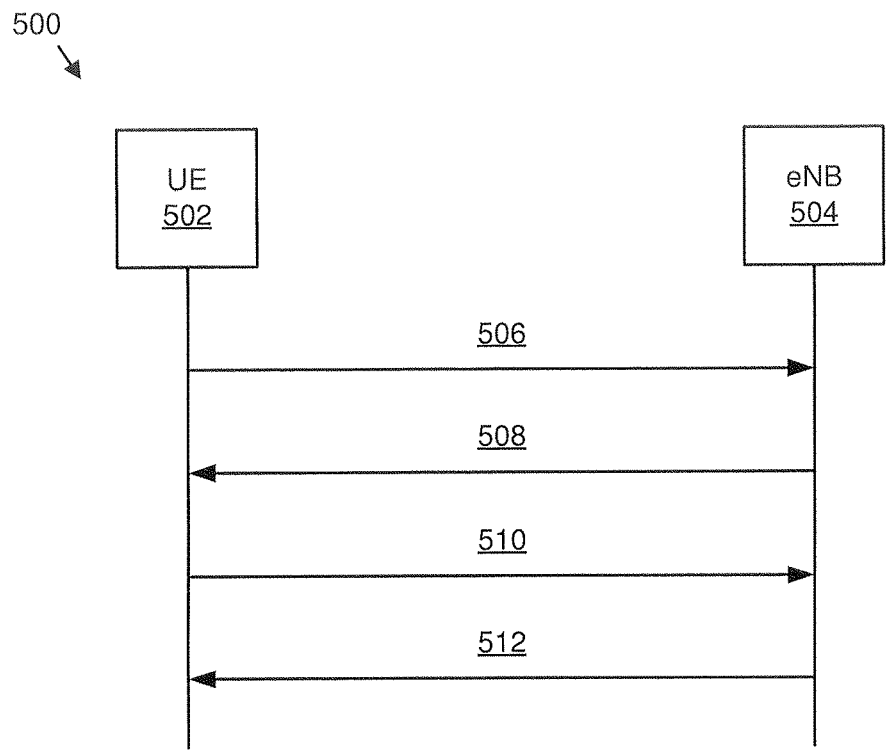
FIG. 5 illustrates one embodiment of communications for a contention based random access procedure.

FIG. 5 illustrates one embodiment of communications 500 for a contention based random access procedure. Specifically, communications 500 between a UE 502 and an eNB 504 are illustrated. As may be appreciated, any of the communications 500 described herein may be considered messages and/or parts of messages.

In some embodiments, in a first communication 506, the UE 502 may transmit information to the eNB 504. Specifically, the UE 502 may transmit a random access preamble in uplink to the eNB 504.

In various embodiments, in a second communication 508, the eNB 504 may transmit information to the UE 502. Specifically, the eNB 504 may transmit a random access response to the UE 502. In some embodiments, the random access response may convey one or more of a random access preamble identifier, timing alignment information for the TAG, and/or initial UL grant and assignment of temporary C-RNTI (e.g., which may or may not be made permanent upon contention resolution).

In certain embodiments, in a third communication 510, the UE 502 may transmit information to the eNB 504. Specifically, the UE 502 may transmit a first scheduled UL transmission to the eNB 504. In various embodiments, the first scheduled UL transmission may convey the ciphered and integrity protected RRC handover confirmation generated by the RRC layer and transmitted by DCCH, convey the C-RNTI of the UE 502 (e.g., allocated by the handover command), and/or include an uplink buffer status report.

In some embodiments, in a fourth communication 512, the eNB 504 may transmit information to the UE 502. Specifically, the eNB 504 may transmit a contention resolution message to the UE 502.

Figure 6:
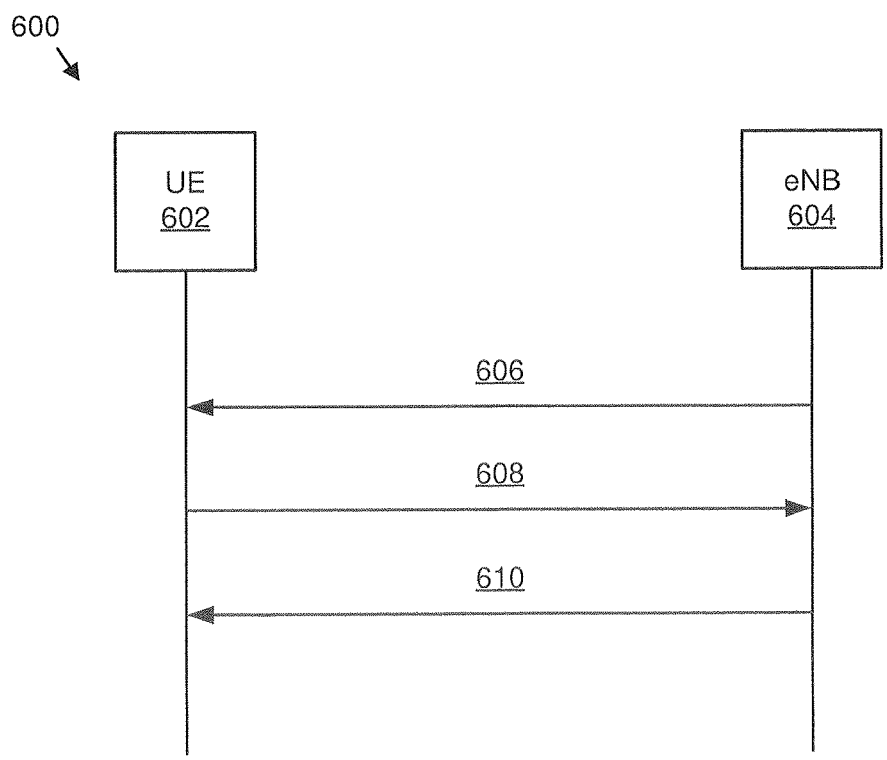
FIG. 6 illustrates one embodiment of communications for a non-contention based random access procedure.

FIG. 6 illustrates one embodiment of communications 600 for a non-contention based random access procedure. Specifically, communications 600 between a UE 602 and an eNB 604 are illustrated. As may be appreciated, any of the communications 600 described herein may be considered messages and/or parts of messages.

In some embodiments, in a first communication 606, the eNB 604 may transmit information to the UE 602. Specifically, the eNB 604 may transmit a random access preamble assignment via DL dedicated signaling. In various embodiments, the eNB 604 may assign to the UE 602 a non-contention random access preamble via a handover command.

In certain embodiments, in a second communication 608, the UE 602 may transmit information to the eNB 604. Specifically, the UE 602 may transmit a random access preamble to the eNB 604. In some embodiments, the UE 602 may transmit an assigned random access preamble.

In various embodiments, in a third communication 610, the eNB 604 may transmit information to the UE 602. Specifically, the eNB 604 may transmit a random access response, such as on a DL shared channel. In one embodiment, the third communication 610 may include timing alignment information, an initial UL grant for handover, timing alignment information DL data arrival, and/or a random access preamble identifier.

In some embodiments, handover may not properly occur as a result of: an RLF occurring after a UE has stayed for a long period of time in a cell and the UE may attempt to reestablish the radio link connection in a different cell (e.g., too late handover); an RLF occurring shortly after a successful handover from a source cell to a target cell or during a handover procedure and the UE may attempt to reestablish the radio link connection in the source cell (e.g., too early handover); and/or an RLF occurring shortly after a successful handover from a source cell to a target cell or during a handover procedure and the UE may attempt to reestablish the radio link connection in a cell other than the source cell and the target cell (e.g., handover to wrong cell). To overcome handovers not properly occurring, conditional handover may be used. Conditional handover may function as described in relation to FIG. 7.

Figure 7:
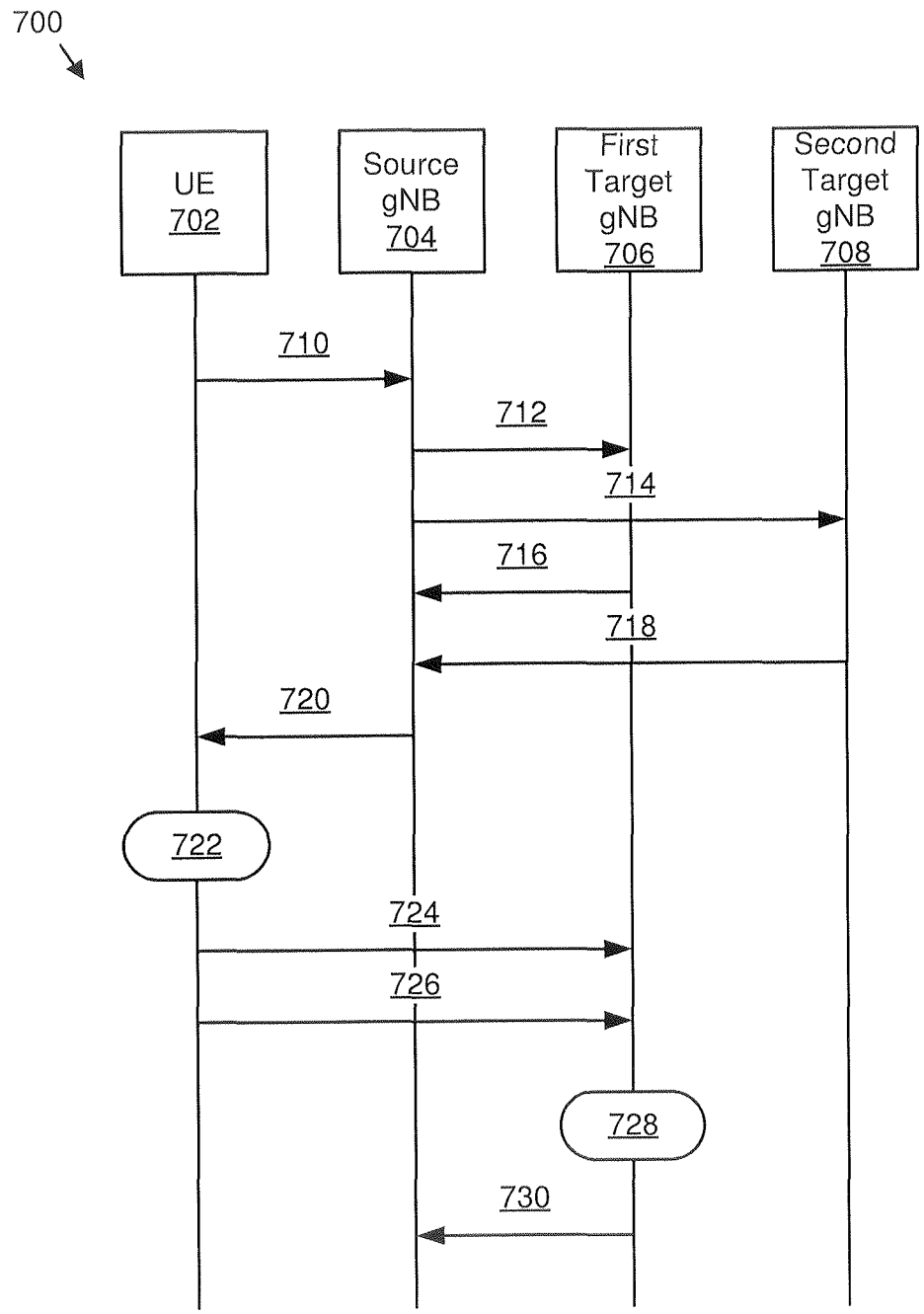
FIG. 7 illustrates one embodiment of communications for a conditional handover.

FIG. 7 illustrates one embodiment of communications 700 for a conditional handover. Specifically, communications 700 between a UE 702, a source gNB 704 (e.g., or source eNB), a first target gNB 706 (e.g., or target eNB), and a second target gNB 708 (e.g., or target eNB) are illustrated.

As may be appreciated, any of the communications 700 described herein may be considered messages and/or parts of messages.

In some embodiments, in a first communication 710, the UE 702 may transmit information to the source gNB 704. Specifically, the UE 702 may report measurement results (e.g., RSRP, RSRQ, etc.) to the source gNB 704.

In certain embodiments, in a second communication 712, the source gNB 704 may transmit information to the first target gNB 706. Specifically, the source gNB 704 may transmit a handover request to the first target gNB 706. In some embodiments, if the source gNB 704 makes a decision to perform a conditional handover based on the measurement results transmitted from the UE 702 to the source gNB 704, the source gNB 704 sends the handover request to the first target gNB 706.

In various embodiments, in a third communication 714, the source gNB 704 may transmit information to the second target gNB 708. Specifically, the source gNB 704 may transmit a handover request to the second target gNB 708. Moreover, in certain embodiments, the source gNB 704 may transmit handover requests to any number of target gNBs.

In some embodiments, in a fourth communication 716, the first target gNB 706 may transmit information to the source gNB 704. Specifically, the first target gNB 706 may transmit a handover acknowledge to the source gNB 704.

In certain embodiments, in a fifth communication 718, the second target gNB 708 may transmit information to the source gNB 704. Specifically, the second target gNB 708 may transmit a handover acknowledge to the source gNB 704. Moreover, in some embodiments, handover acknowledge messages may be transmitted from any number of target gNBs to the source gNB 704.

In various embodiments, in a sixth communication 720, the source gNB 704 may transmit information to the UE 702. Specifically, the source gNB 704 may transmit information including a radio resource control connection reconfiguration message having mobility control information and a condition for handover configured by the source gNB 704 to the UE 702. In certain embodiments, the sixth communication 720 may include a handover condition corresponding to each of one or more target gNBs.

In some embodiments, the UE 702 may determine 722 whether a handover condition is met (e.g., triggered) for each of one or more target gNBs.

In certain embodiments, in a seventh communication 724, the UE 702 may transmit information to the first target gNB 706. Specifically, the UE 702 may apply the radio resource control connection reconfiguration and access the first target gNB 706 in response to the handover condition being met.

In various embodiments, in an eighth communication 726, the UE 702 may transmit information to the first target gNB 706. Specifically, the UE 702 may transmit an RRC reconfiguration complete message to the first target gNB 706.

In some embodiments, the first target gNB 706 may perform 728 a path switch associated with a core network.

In certain embodiments, in a ninth communication 730, the first target gNB 706 may transmit information to the source gNB 704. Specifically, the first target gNB 706 may transmit a handover complete message to the source gNB 704 to indicate that handover is completed successfully.

Figure 8:
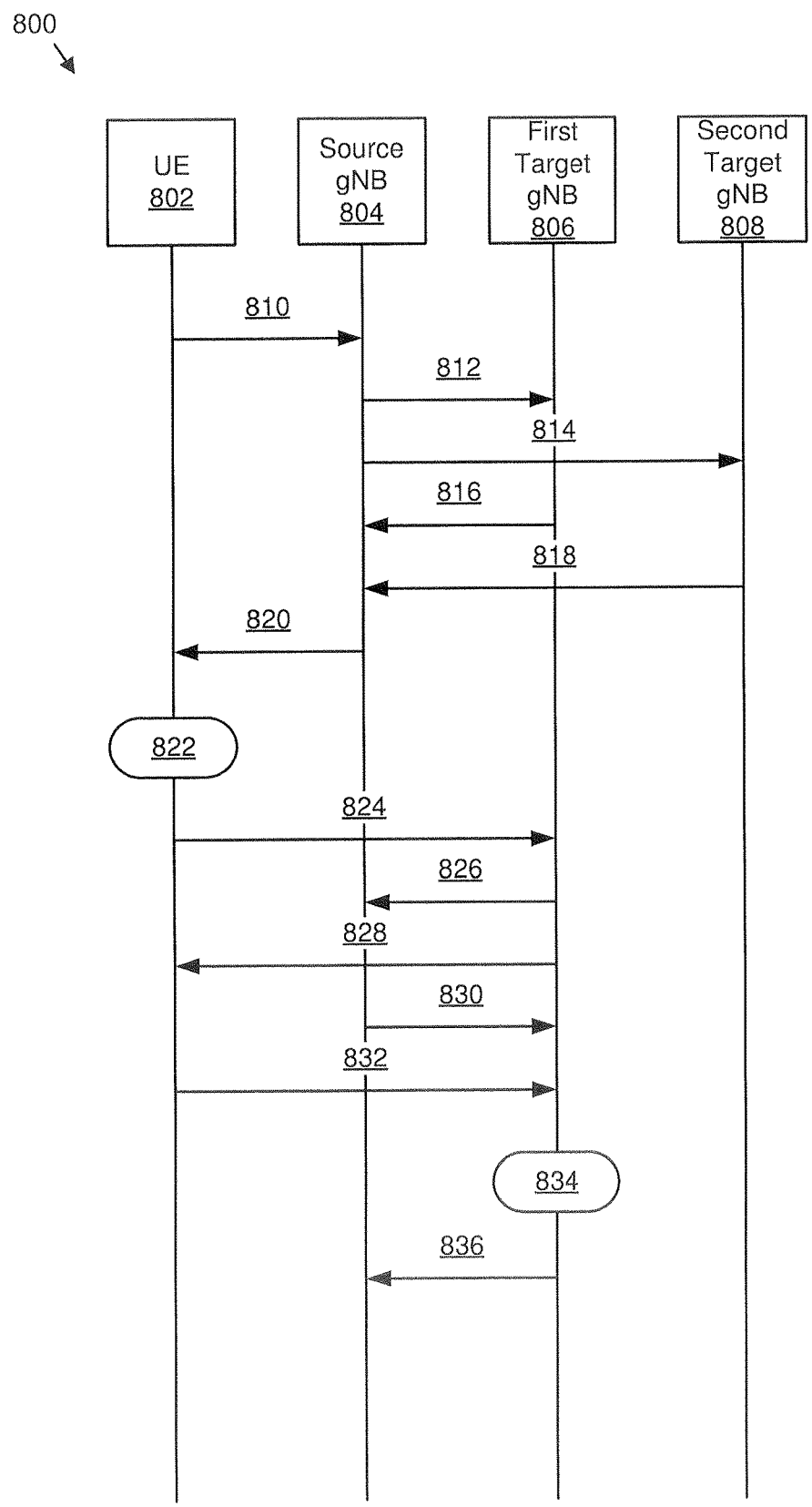
FIG. 8 illustrates one embodiment of communications for a conditional handover corresponding to non-contention based random access.

FIG. 8 illustrates one embodiment of communications 800 for a conditional handover corresponding to non-contention based random access. Specifically, communications 800 between a UE 802, a source gNB 804 (e.g., or source eNB), a first target gNB 806 (e.g., target eNB, base unit, etc.), and a second target gNB 808 (e.g., target eNB, base unit, etc.) are illustrated. As may be appreciated, any of the communications 800 described herein may be considered messages and/or parts of messages.

In some embodiments, in a first communication 810, the UE 802 may transmit information to the source gNB 804. Specifically, the UE 802 may report measurement results (e.g., RSRP, RSRQ, etc.) to the source gNB 804.

In certain embodiments, in a second communication 812, the source gNB 804 may transmit information to the first target gNB 806. Specifically, the source gNB 804 may transmit a handover request to the first target gNB 806. In some embodiments, if the source gNB 804 makes a decision to perform a conditional handover based on the measurement results transmitted from the UE 802 to the source gNB 804, the source gNB 804 sends the handover request to the first target gNB 806.

In various embodiments, in a third communication 814, the source gNB 804 may transmit information to the second target gNB 808. Specifically, the source gNB 804 may transmit a handover request to the second target gNB 808. Moreover, in certain embodiments, the source gNB 804 may transmit handover requests to any number of target gNBs.

In some embodiments, in a fourth communication 816, the first target gNB 806 may transmit information to the source gNB 804. Specifically, the first target gNB 806 may transmit a handover acknowledge to the source gNB 804.

In certain embodiments, in a fifth communication 818, the second target gNB 808 may transmit information to the source gNB 804. Specifically, the second target gNB 808 may transmit a handover acknowledge to the source gNB 804. Moreover, in some embodiments, handover acknowledge messages may be transmitted from any number of target gNBs to the source gNB 804.

In various embodiments, in a sixth communication 820, the source gNB 804 may transmit information to the UE 802. Specifically, the source gNB 804 may transmit information including a radio resource control connection reconfiguration message having mobility control information and a condition for handover configured by the source gNB 804 to the UE 802. In certain embodiments, the sixth communication 820 may include a handover command that includes information for one or more than one target gNB. In such embodiments, each target gNB may be associated with one condition for triggering handover. In various embodiments, the radio resource control connection reconfiguration message may include information that indicates a non-contention random access preamble.

In some embodiments, the UE 802 may determine 822 whether a handover condition is met (e.g., triggered) for each of one or more target gNBs. In one embodiment, the UE 802 may inform the source gNB 804 about which cell the UE 802 is about to perform random access with before selecting one of the one or more target gNBs.

In certain embodiments, in a seventh communication 824, the UE 802 may transmit information to the first target gNB 806. Specifically, the UE 802 transmit a random access preamble to the first target gNB 806 in response to the handover condition being met. In various embodiments, the first target gNB 806 may be selected as a first choice for handover because the handover condition corresponding to the first target gNB 806 is met and the first target gNB 806 has a higher signal strength (e.g., power level) than other target gNBs that have the handover condition met. In some embodiments, the UE 802 may not successfully perform a handover to the first target gNB 806, such as because of an inability to access the first target gNB 806. In such embodiments, the inability to access the first target gNB 806 may result from the UE 802 receiving no response from the first target gNB 806 in response to the seventh communication 824. In embodiments in which the UE 802 does not successfully perform a handover to the first target gNB 806, the UE 802 may attempt to perform a handover to any other target gNBs for which a handover condition is met (e.g., the UE 802 may select target gNBs based on their signal strength with higher signal strengths being selected first). Accordingly, any communication described herein that corresponds to the first target gNB 806 may also relate to communications corresponding to any target gNB. If the UE 802 is not successful at performing a handover to any of the target gNBs for which a handover condition is met, the UE 802 may perform a reestablishment procedure. In some embodiments, the UE 802 may select any target gNBs (e.g., target gNBs for which a handover condition is not met) to establish communication with. In such embodiments, the UE 802 may select a target gNB based on signal strength without considering handover conditions (e.g., select the target gNB having the highest signal strength).

In various embodiments, in an eighth communication 826, the first target gNB 806 may transmit information to the source gNB 804. Specifically, the first target gNB 806 may transmit information including request signaling to the source gNB 804. In some embodiments, the request signaling may be a request for sequence number status transfer information and/or data forwarding information. By transmitting the request signaling in response to receiving the random access preamble, the sequence number status transfer information and/or data may be transmitted from the source gNB 804 to the first target gNB 806 before the handover complete message is sent, thereby reducing latency.

In some embodiments, in a ninth communication 828, the first target gNB 806 may transmit information to the UE 802. Specifically, the first target gNB 806 may transmit a random access response to the UE 802.

In certain embodiments, in a tenth communication 830, the source gNB 804 may transmit information to the first target gNB 806. Specifically, the source gNB 804 may transmit sequence number status transfer information to the first target gNB 806 and/or perform a data forwarding procedure to forward data information to the first target gNB 806.

In various embodiments, in an eleventh communication 832, the UE 802 may transmit information to the first target gNB 806. Specifically, the UE 802 may transmit an RRC reconfiguration complete message to the first target gNB 806.

In some embodiments, the first target gNB 806 may perform 834 a path switch associated with a core network.

In certain embodiments, in a twelfth communication 836, the first target gNB 806 may transmit information to the source gNB 804. Specifically, the first target gNB 806 may transmit a handover complete message to the source gNB 804 to indicate that handover is completed successfully.

Figure 9:
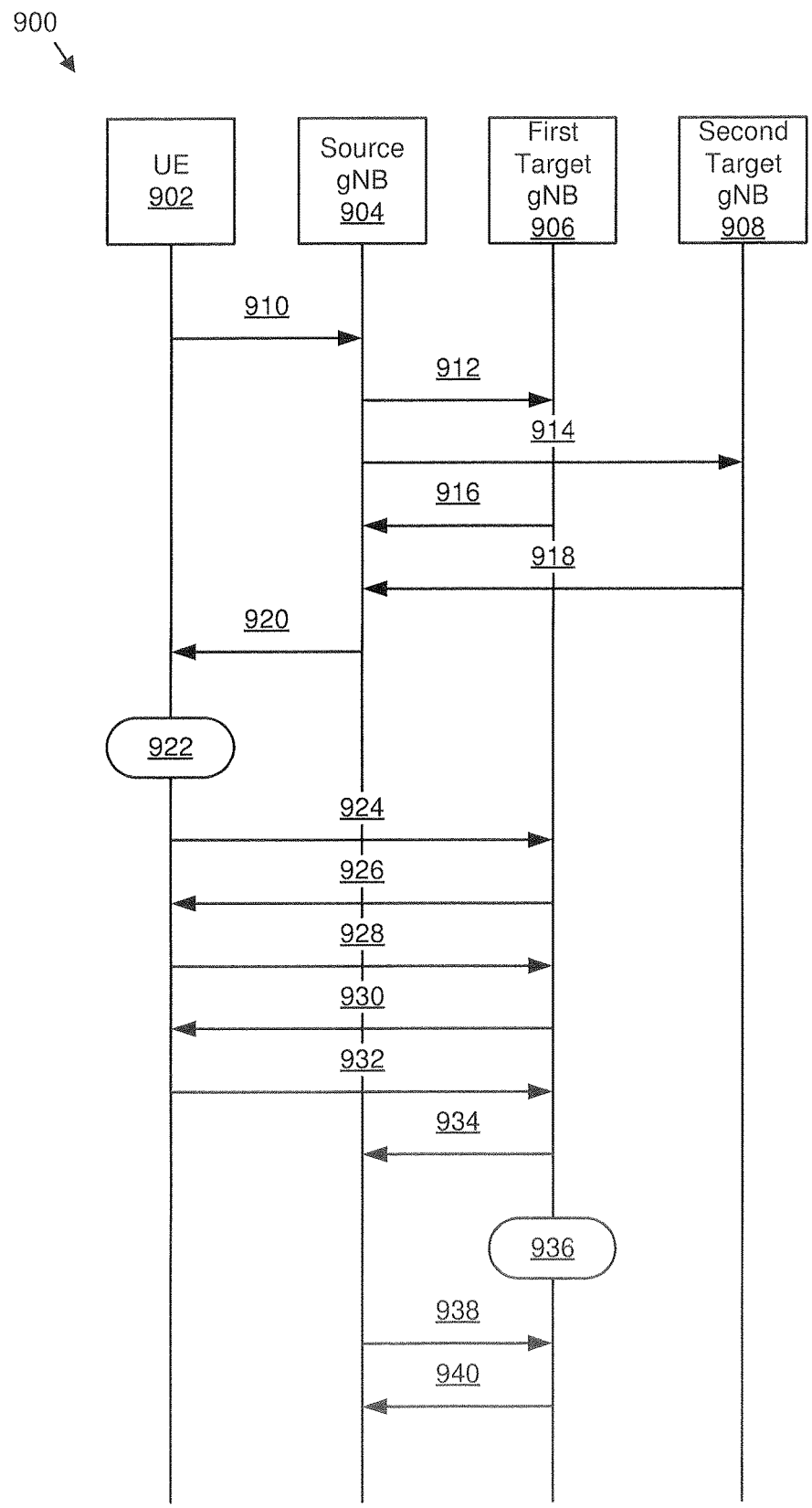
FIG. 9 illustrates one embodiment of communications for a conditional handover corresponding to contention based random access.

FIG. 9 illustrates one embodiment of communications 900 for a conditional handover corresponding to contention based random access. Specifically, communications 900 between a UE 902, a source gNB 904 (e.g., or source eNB), a first target gNB 906 (e.g., target eNB, base unit, etc.), and a second target gNB 908 (e.g., target eNB, base unit, etc.) are illustrated. As may be appreciated, any of the communications 900 described herein may be considered messages and/or parts of messages.

In some embodiments, in a first communication 910, the UE 902 may transmit information to the source gNB 904. Specifically, the UE 902 may report measurement results (e.g., RSRP, RSRQ, etc.) to the source gNB 904.

In certain embodiments, in a second communication 912, the source gNB 904 may transmit information to the first target gNB 906. Specifically, the source gNB 904 may transmit a handover request to the first target gNB 906. In some embodiments, if the source gNB 904 makes a decision to perform a conditional handover based on the measurement results transmitted from the UE 902 to the source gNB 904, the source gNB 904 sends the handover request to the first target gNB 906.

In various embodiments, in a third communication 914, the source gNB 904 may transmit information to the second target gNB 908. Specifically, the source gNB 904 may transmit a handover request to the second target gNB 908. Moreover, in certain embodiments, the source gNB 904 may transmit handover requests to any number of target gNBs.

In some embodiments, in a fourth communication 916, the first target gNB 906 may transmit information to the source gNB 904. Specifically, the first target gNB 906 may transmit a handover acknowledge to the source gNB 904.

In certain embodiments, in a fifth communication 918, the second target gNB 908 may transmit information to the source gNB 904. Specifically, the second target gNB 908 may transmit a handover acknowledge to the source gNB 904. Moreover, in some embodiments, handover acknowledge messages may be transmitted from any number of target gNBs to the source gNB 904.

In various embodiments, in a sixth communication 920, the source gNB 904 may transmit information to the UE 902. Specifically, the source gNB 904 may transmit information including a radio resource control connection reconfiguration message having mobility control information and a condition for handover configured by the source gNB 904 to the UE 902. In certain embodiments, the sixth communication 920 may include a handover condition corresponding to each of one or more target gNBs. In various embodiments, the radio resource control connection reconfiguration message may include information that indicates a non-contention random access preamble.

In some embodiments, the UE 902 may determine 922 whether a handover condition is met (e.g., triggered) for each of one or more target gNBs. In one embodiment, the UE 902 may inform the source gNB 904 about which cell the UE 902 is about to perform random access with before selecting one of the one or more target gNBs.

In certain embodiments, in a seventh communication 924, the UE 902 may transmit information to the first target gNB 906. Specifically, the UE 902 may transmit a random access preamble to the first target gNB 906 in response to the handover condition being met. In various embodiments, the first target gNB 906 may be selected as a first choice for handover because the handover condition corresponding to the first target gNB 906 is met and the first target gNB 906 has a higher signal strength (e.g., power level) than other target gNBs that have the handover condition met. In some embodiments, the UE 902 may not successfully perform a handover to the first target gNB 906, such as because of an inability to access the first target gNB 906. In such embodiments, the inability to access the first target gNB 906 may result from the UE 902 receiving no response from the first target gNB 906 in response to the seventh communication 924. In embodiments in which the UE 902 does not successfully perform a handover to the first target gNB 906, the UE 902 may attempt to perform a handover to any other target gNBs for which a handover condition is met (e.g., the UE 902 may select target gNBs based on their signal strength with higher signal strengths being selected first). Accordingly, any communication described herein that corresponds to the first target gNB 906 may also relate to communications corresponding to any target gNB. If the UE 902 is not successful at performing a handover to any of the target gNBs for which a handover condition is met, the UE 902 may perform a reestablishment procedure. In some embodiments, the UE 902 may select any target gNBs (e.g., target gNBs for which a handover condition is not met) to establish communication with. In such embodiments, the UE 902 may select a target gNB based on signal strength without considering handover conditions (e.g., select the target gNB having the highest signal strength).

In some embodiments, in an eighth communication 926, the first target gNB 906 may transmit information to the UE 902. Specifically, the first target gNB 906 may transmit a random access response to the UE 902.

In various embodiments, in a ninth communication 928, the UE 902 may transmit information to the first target gNB 906. Specifically, the UE 902 may transmit a first schedule UL transmission to the first target gNB 906.

In certain embodiments, in a tenth communication 930, the first target gNB 906 may transmit information to the UE 902. Specifically, the first target gNB 906 may transmit contention resolution to the UE 902.

In some embodiments, in an eleventh communication 932, the UE 902 may transmit information to the first target gNB 906. Specifically, the UE 902 may transmit an RRC reconfiguration complete message to the first target gNB 906 after determining that the random access is successful.

In various embodiments, in a twelfth communication 934, the first target gNB 906 may transmit information to the source gNB 904. Specifically, the first target gNB 906 may transmit information including request signaling to the source gNB 904. In some embodiments, the request signaling may be a request for sequence number status transfer information and/or data forwarding information. By transmitting the request signaling in response to receiving the RRC reconfiguration complete message, the sequence number status transfer information and/or data may be transmitted from the source gNB 904 to the first target gNB 906 before the handover complete message is sent, thereby reducing latency.

In some embodiments, the first target gNB 906 may perform 936 a path switch associated with a core network.

In certain embodiments, in a thirteenth communication 938, the source gNB 904 may transmit information to the first target gNB 906. Specifically, the source gNB 904 may transmit sequence number status transfer information to the first target gNB 906 and/or perform a data forwarding procedure to forward data information to the first target gNB 906.

In various embodiments, in a fourteenth communication 940, the first target gNB 906 may transmit information to the source gNB 904. Specifically, the first target gNB 906 may transmit a handover complete message to the source gNB 904 to indicate that handover is completed successfully.

Figure 10:
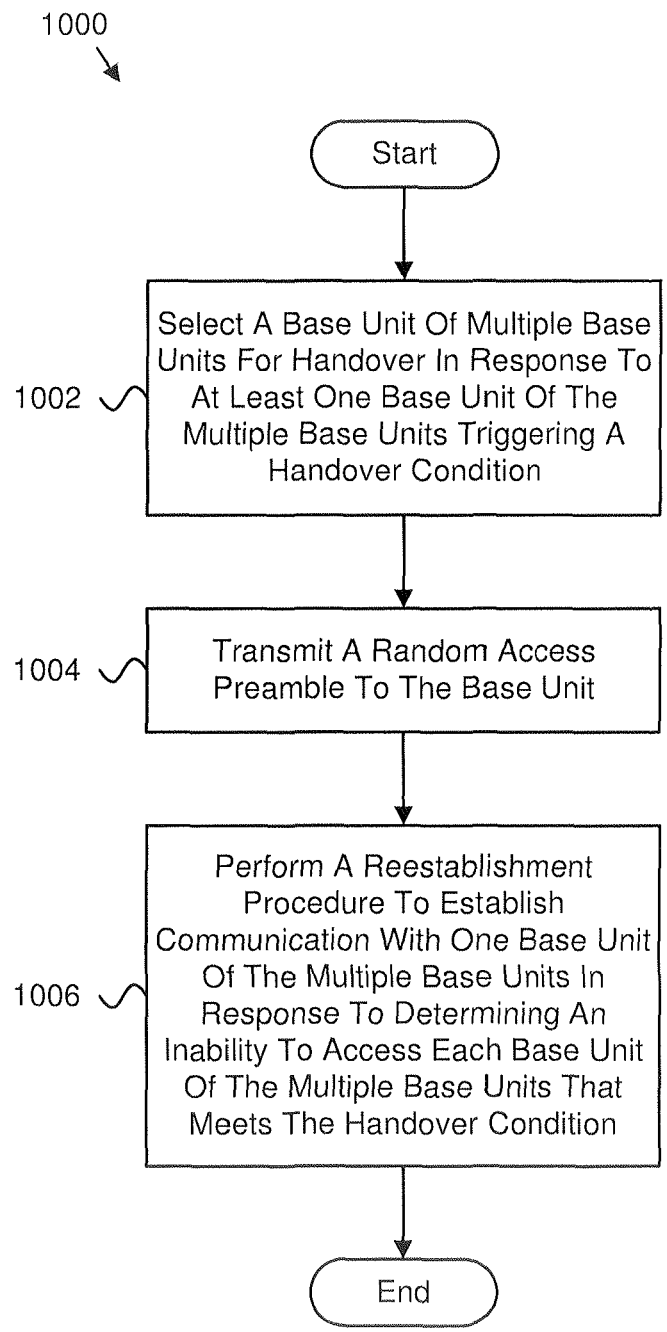
FIG. 10 is a schematic flow chart diagram illustrating one embodiment of a method for selecting a base unit in response to a handover condition being triggered.

FIG. 10 is a schematic flow chart diagram illustrating one embodiment of a method 1000 for selecting a base unit in response to a handover condition being triggered. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include selecting 1002 a base unit of multiple base units for handover in response to at least one base unit of the multiple base units triggering a handover condition. In various embodiments, the method 1000 includes transmitting 1004 a random access preamble to the base unit. In certain embodiments, the method 1000 includes performing 1006 a reestablishment procedure to establish communication with one base unit of the multiple base units in response to determining an inability to access each base unit of the plurality of base units that meets the handover condition.

In one embodiment, the method 1000 includes determining an inability to access the base unit. In a further embodiment, determining the inability to access the base unit includes receiving no response from the base unit as a result of transmitting the random access preamble to the base unit. In certain embodiments, the method 1000 includes, in response to determining the inability to access the base unit, transmitting a second random access preamble to a second base unit of the multiple base units. In various embodiments, the method 1000 includes receiving configuration information indicating the handover condition corresponding to the base unit. In some embodiments, the configuration information includes a radio resource control connection reconfiguration message having mobility control information.

Figure 11:
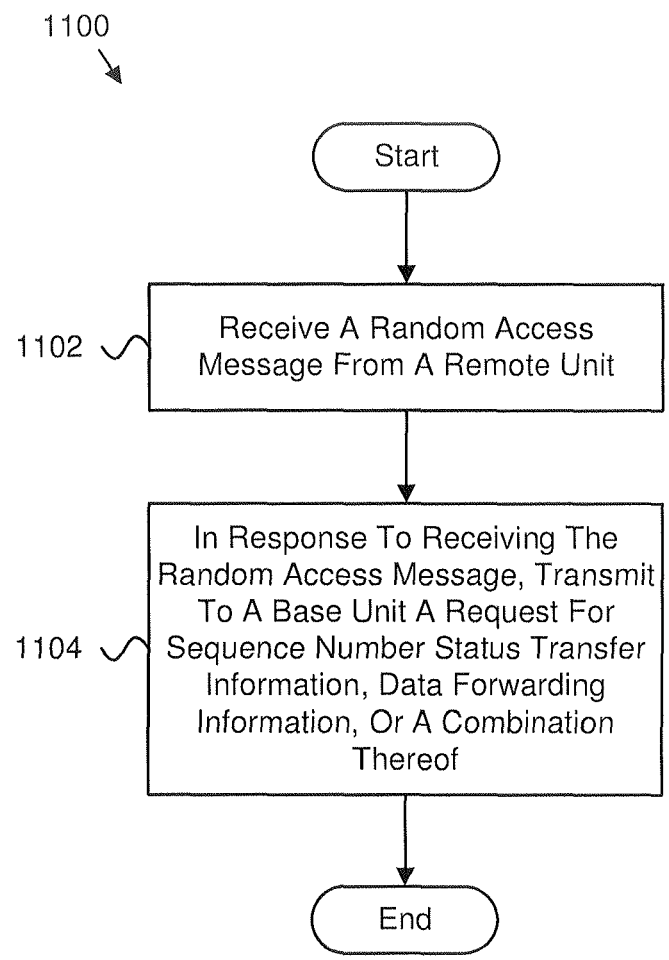
FIG. 11 is a schematic flow chart diagram illustrating one embodiment of a method for transmitting a request for information.

FIG. 11 is a schematic flow chart diagram illustrating one embodiment of a method 1100 for transmitting a request for information. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a random access message from a remote unit 102. In various embodiments, the method 1100 includes, in response to receiving the random access message, transmitting 1104 to a base unit a request for sequence number status transfer information, data forwarding information, or a combination thereof.

In one embodiment, the random access message includes a random access preamble. In a further embodiment, the random access message includes a radio resource control reconfiguration complete message. In certain embodiments, the method 1100 includes receiving the sequence number status transfer information, data corresponding to the data forwarding information, or a combination thereof in response to transmitting the request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first base station, the method comprising:
   receiving, in response to a user equipment (UE) not receiving a response to a first random access preamble transmitted from the UE to a second base station, a random access message from the UE;
   in response to receiving the random access message, transmitting, to the second base station, a request for sequence number transfer information;
   subsequent to transmitting the request for sequence number transfer information, transmitting a random access response message to the UE;
   receiving sequence number transfer information from the second base station in response to transmitting the request for the sequence number transfer information; and
   transmitting a handover completion message to the second base station in response to receiving the sequence number transfer information.

2. The method of claim 1, wherein the random access message comprises a second random access preamble.

3. The method of claim 2, wherein the second random access preamble comprises a non-contention based random access preamble indicated to the UE by the second base station.

4. The method of claim 1, wherein the random access message comprises a radio resource control reconfiguration complete message.

5. The method of claim 1, further comprising transmitting, to the second base station, a request for data forwarding information.

6. The method of claim 1, further comprising transmitting the handover completion message to the second base station subsequent to receiving the sequence number transfer information.

7. The method of claim 1, further comprising receiving the random access message from the UE further in response to the first base station having a higher signal strength than a third base station.

8. The method of claim 1, further comprising receiving the random access message from the UE further in response to the UE not receiving a response to a second random access preamble transmitted from the UE to a third base station.

9. The method of claim 1, further comprising receiving, subsequent to transmitting the request for sequence number transfer information and prior to transmitting the handover completion message, a radio resource control reconfiguration complete message from the UE.

10. A first base station, comprising:
    at least one memory; and
    at least one processor coupled with the at least one memory and configured to cause the first base station to:
    receive, in response to a user equipment (UE) not receiving a response to a first random access preamble transmitted from the UE to a second base station, a random access message from the UE;
    in response to receiving the random access message, transmit, to the second base station, a request for sequence number transfer information;
    subsequent to transmitting the request for sequence number transfer information, transmit a random access response message to the UE;
    receive sequence number transfer information from the second base station in response to transmitting the request for the sequence number transfer information; and
    transmit a handover completion message to the second base station in response to receiving the sequence number transfer information.

11. The first base station of claim 10, wherein the random access message comprises a second random access preamble.

12. The first base station of claim 11, wherein the second random access preamble comprises a non-contention based random access preamble indicated to the UE by the second base station.

13. The first base station of claim 10, wherein the random access message comprises a radio resource control reconfiguration complete message.

14. The first base station of claim 10, wherein the at least one processor is configured to cause the first base station to transmit, to the second base station, a request for data forwarding information.

15. The first base station of claim 10, wherein the at least one processor is further configured to cause the first base station to receive the random access message from the UE further in response to the first base station having a higher signal strength than a third base station.

16. The first base station of claim 10, wherein the at least one processor is further configured to cause the first base station to receive the random access message from the UE further in response to the UE not receiving a response to a second random access preamble transmitted from the UE to a third base station.

17. The first base station of claim 10, wherein the at least one processor is further configured to cause the first base station to receive, subsequent to causing the first base station to transmit the request for sequence number transfer information and prior to causing the first base station to transmit the handover completion message, a radio resource control reconfiguration complete message from the UE.

\* \* \* \* \*